UNITED STATES PATENT OFFICE.

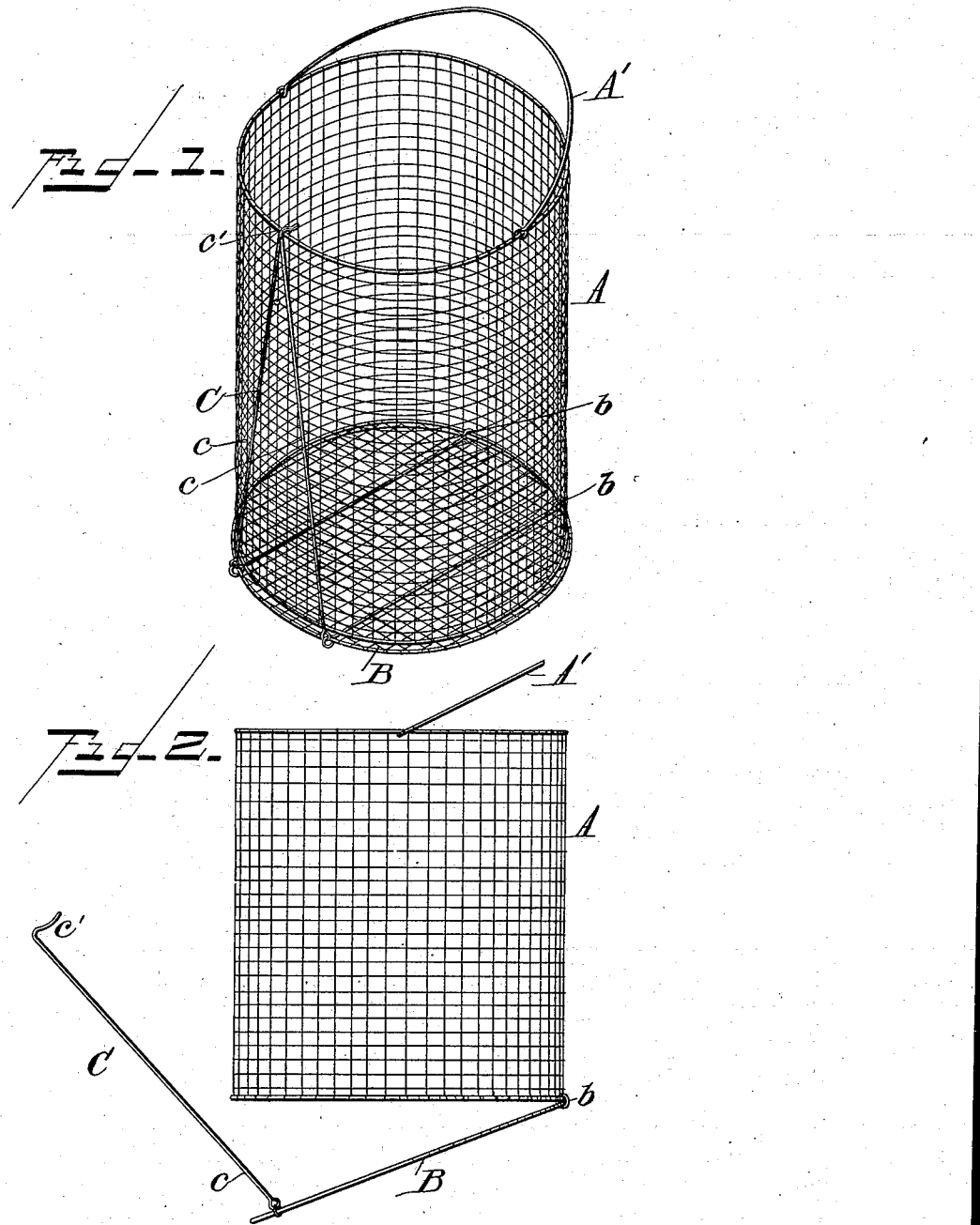

JAMES H. ROSE, OF TIVERTON, RHODE ISLAND.

CULINARY VESSEL.

SPECIFICATION forming part of Letters Patent No. 651,977, dated June 19, 1900.

Application filed August 24, 1899. Serial No. 728,285. (No model.)

*To all whom it may concern:*

Be it known that I, JAMES H. ROSE, a citizen of the United States, residing at Tiverton, in the county of Newport and State of Rhode Island, have invented certain new and useful Improvements in Culinary Vessels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to cooking vessels in which is employed an interior wire basket to contain the vegetables or other articles to be cooked.

One object of the invention is to improve the wire basket generally used for this purpose by providing it with a downwardly-swinging bottom to discharge the cooked contents without danger of burning the hands.

A further object is to provide such downwardly-swinging bottom with a simple and effective catch to hold it closed and also to render said bottom strong and rigid.

Referring now to the accompanying drawings, Figure 1 is a perspective view of a wire basket with my improvements applied, the bottom being closed; and Fig. 2 is a side elevation of the same, showing the catch released and the bottom open.

A designates the body of an ordinary cylindrical wire basket provided with the usual bail A'. The lower end of the basket is open and provided with a bottom B, consisting of wire-netting secured to a ring of wire which forms the rim of said bottom. Transversely under said bottom extend two wires preferably equidistant from the edges of the bottom and from each other. These wires are hinged at one end to the lower edge of the body, as shown at $b\ b$, and to their opposite ends are hinged the lower diverging ends $c\ c$ of the latch C, the upper end of which is provided with an inwardly-projecting lip or catch $c'$ to snap over or engage the upper edge of the basket. This latch C is preferably formed of a single length of wire bent to the form shown.

While I have described the basket as made of wire, it is obvious that it might be made of foraminated sheet metal, as both materials are common in this class of devices.

The articles to be cooked are placed within the basket, which is then lowered into a suitable kettle or boiler, and after the articles have been sufficiently cooked the basket is lifted out by the bail and held over a suitable receptacle, when the latch C is released and the bottom falls down to discharge the contents of the basket into such receptacle.

It will be seen that the transverse wires under the bottom B serve to sustain it against the weight of the contents of the basket, and thus render it rigid and strong. They also afford excellent means for forming a strong hinge between the bottom and the body of the basket and the catch.

What I claim, and desire to secure by Letters Patent, is—

A culinary vessel of the character described, having a downwardly-swinging bottom provided with wires extending transversely under it and hinged at one end to the lower edge of the body, and a catch composed of a forked length of wire with its diverging ends hinged to the free ends of the transverse wires, and its opposite end bent to form a lip or catch to snap over or engage the upper edge of the basket.

In testimony whereof I affix my signature in presence of two witnesses.

JAMES H. ROSE.

Witnesses:
ARBA N. LINCOLN,
FRED. J. MCLANE.